US009267279B2

(12) United States Patent
Schroeer et al.

(10) Patent No.: US 9,267,279 B2
(45) Date of Patent: Feb. 23, 2016

(54) SHEET, IN PARTICULAR FOR USE IN THE BUILDING SECTOR

(75) Inventors: Joern Schroeer, Herdecke (DE); Ronald Flaig, Leverkusen (DE)

(73) Assignee: Ewald Dörken AG, Herdecke (DE)

( * ) Notice: Subject to any disclaimer, the term of this patent is extended or adjusted under 35 U.S.C. 154(b) by 319 days.

(21) Appl. No.: 13/638,307

(22) PCT Filed: Apr. 6, 2011

(86) PCT No.: PCT/EP2011/001706
§ 371 (c)(1),
(2), (4) Date: Sep. 28, 2012

(87) PCT Pub. No.: WO2011/124367
PCT Pub. Date: Oct. 13, 2011

(65) Prior Publication Data
US 2013/0022779 A1   Jan. 24, 2013

(30) Foreign Application Priority Data

Apr. 7, 2010 (DE) .......................... 10 2010 014 124
Apr. 29, 2010 (DE) .......................... 10 2010 018 810

(51) Int. Cl.
| E04B 1/66 | (2006.01) |
| B32B 27/06 | (2006.01) |
| B32B 27/12 | (2006.01) |
| B32B 5/02 | (2006.01) |
| B32B 5/24 | (2006.01) |
| E04B 1/62 | (2006.01) |

(52) U.S. Cl.
CPC . *E04B 1/66* (2013.01); *B32B 5/022* (2013.01); *B32B 5/245* (2013.01); *B32B 27/065* (2013.01); *B32B 27/12* (2013.01); *B32B 2266/06* (2013.01); *B32B 2307/724* (2013.01); *B32B 2307/762* (2013.01); *B32B 2405/00* (2013.01); *E04B 1/625* (2013.01); *Y10T 428/24008* (2015.01);

(Continued)

(58) Field of Classification Search
USPC ............................................ 428/304.4, 314.4
See application file for complete search history.

(56) References Cited

U.S. PATENT DOCUMENTS 4,714,651 A    12/1987  Hartmann et al.
7,569,625 B2    8/2009  Keller et al.

(Continued)

FOREIGN PATENT DOCUMENTS

DE    30 00 238 A1    7/1981
DE    35 24 580 C1    2/1987

(Continued)

OTHER PUBLICATIONS

International Search Rport of International Applicaiton No. PCT/EP2011/001706, Mail Date Oct. 23, 2012.

*Primary Examiner* — Hai Vo
(74) *Attorney, Agent, or Firm* — Roberts Mlotkowski Safran & Cole, PC; David S. Safran

(57) ABSTRACT

A sheet (1), preferably for use in the building sector, and in particular, for sealing the shell of a building, comprising a planar sheet body (2) that has at least one elastic layer as a sealing layer (17) made of a material of such elasticity and such restoring force that, when the sealing layer (17) is penetrated by a fastener (4), the material of the sealing layer (17) surrounding the fastening means (4) encloses the fastener (4) and provides sealing in the region of the fastener (4). Alternatively, the sheet body contains a sealing material which, upon perforation of the sheet body, is able to automatically emerge or swell to an extent sufficient to close or seal the perforation.

11 Claims, 6 Drawing Sheets

(52) U.S. Cl.
CPC .................. *Y10T428/249984* (2015.04); *Y10T 428/249991* (2015.04); *Y10T 428/31551* (2015.04); *Y10T 428/31935* (2015.04)

(56) References Cited

U.S. PATENT DOCUMENTS

| | | | | |
|---|---|---|---|---|
| 8,757,626 | B2 * | 6/2014 | Acker | ............................ 273/403 |
| 2003/0041537 | A1 * | 3/2003 | Glover et al. | ................ 52/204.5 |
| 2006/0008496 | A1 * | 1/2006 | Kulkarni | ................ A01N 25/34 424/412 |
| 2007/0042150 | A1 | 2/2007 | Hopkins et al. | |
| 2007/0042196 | A1 * | 2/2007 | Smith | ............................ 428/446 |
| 2009/0084047 | A1 * | 4/2009 | Williams | .................... 52/169.14 |
| 2009/0165920 | A1 * | 7/2009 | Yamaguchi | ............ C09J 7/0214 156/64 |
| 2011/0111207 | A1 | 5/2011 | Doye et al. | |

FOREIGN PATENT DOCUMENTS

| | | |
|---|---|---|
| EP | 1 624 120 A2 | 2/2006 |
| WO | 2005/112691 A2 | 12/2005 |

* cited by examiner

SHEET, IN PARTICULAR FOR USE IN THE BUILDING SECTOR

BACKGROUND OF THE INVENTION

1. Field of the Invention

This invention relates to a sheet, especially for use in the building sector, with a planar sheet body.

2. Description of Related Art

Sheeting and film products in the most varied applications must be fastened to undersurfaces. In the building sector, this relates, for example, to sheets which are used for sealing (airtightness and watertightness) of a building shell (for example, sealing sheets, facade sheets, air and vapor barriers, underlay sheets). If there is wood or wood material in the undersurface, fastening is generally performed mechanically, for example, by tacking, nailing, screwing and/or shooting. The latter three methods are also used in undersurfaces of plasterboard, concrete, plaster and rock. Here, the sheets are perforated such that the sealing function at the perforation site is no longer maintained.

At present, the sealing function is manually restored in a complex manner by subsequent sealing by means of sealing masses, sealing strips or adhesive tapes. One special case is the sealing of nails through counter laths. This is achieved by interposed foam strips (nail sealing strips).

The aforementioned known methods constitute a major additional effort and moreover entail the risk that undetected perforations and damage will continue to cause leaks.

SUMMARY OF THE INVENTION

Therefore, the object of this invention is to avoid the disadvantages of the prior art.

In one embodiment of this invention, it is provided that the sheet body has at least one elastic layer as a sealing layer. Here, the material of the layer has an elasticity and a restoring force such that, when the elastic layer is penetrated by a fastener, the material of the elastic layer surrounding the fastener encompasses the fastener and seals in the region of the fastener.

To achieve the aforementioned object, in one alternative embodiment, it is provided in accordance with the invention that the sheet body contains a material which, in the case of a perforation of the sheet body, emerges or swells automatically out of the sheet body to close and/or seal the perforation opening.

Ultimately, this invention is a self-sealing or self-healing sheet which automatically recloses perforations or perforation openings. Here, the term "perforation" means openings of any type which arise when the sheet is fastened to the undersurface or which are due to damage. This includes perforation openings which arise during fastening, such as unintentional tears or other damage to the sheet.

Otherwise, this invention relates fundamentally to sheeting of any type as well as film products, where the sheet body is made of plastic.

The basic idea of an embodiment of the invention lies in that the elasticity and restoring properties of the material of at least one elastic layer of the sheet body is used in order either to eliminate or close minor damage of the sheet body itself or to seal on the fastener which is penetrating the sheet by corresponding elastic contact itself. In another embodiment, the approach involves the body of the sheet contains a closing or sealing material which in the unperforated state of the sheet remains in the sheet body and is inactive. When the sheet body is perforated/damaged and especially when water and/or air enters, automatic activity of the material arises causing the material to emerge from the sheet body at the perforation site, i.e., runs out and/or swells out, and then, contributes to closing the perforation opening, and in the best case, closes it completely.

In all alternatives, a perforation opening can mean a complete opening or also an annular opening when there is, for example, a nail or fastener in the perforation.

The effect in accordance with the invention can be achieved by the following different principles:

1. Use of Adhesive-containing Microcapsules in the Sheet.

When a fastener penetrates into the sheet, the capsules are destroyed, the adhesive emerges and seals the site. In this case, different alternatives are possible:

a) The microcapsules contain a single-component adhesive. It sets physically or chemically. Preferably, reaction partners in chemical setting are (penetrating) water, oxygen and/or reactive groups of the surrounding matrix material.

b) The microcapsules contain a binary adhesive. The reaction partners react with one another only after release.

c) The contents of the microcapsules react with the material (for example, steel) of the fastener (for example, nails) and form a sealing mass.

d) Two different types of microcapsules are used which contain different reaction partners (for example, resin and curing agent). When the fastener is inserted both types of capsules are destroyed, the reaction partners emerge, react with one another and seal.

e) Use of split microcapsules, for example, a core with a first material (resin) and a shell with a second material (curing agent).

2. Use of Flowing Sealants in Microcapsules.

When the fasteners are inserted, the capsules are destroyed, the sealant flows out and seals the site. Depending on the sealant the following processes can arise:

a) The solvent evaporates, the sealing mass becomes hard.

b) A dispersion is present, the liquid evaporating. Then, the viscosity of the sealing mass rises.

c) There is a swollen and thus easily flowable rubber. The swelling agent evaporates or is taken up and drawn off by the underlay sheet material.

3. Swelling Material in the Microcapsules.

When water enters, the material emerging from the capsules swells up and seals. In doing so, the diameter of the original perforation opening is narrowed, and in the best case, completely closed.

4. Incorporation of at Least One Flowing (Intermediate) Layer.

When the sheet is perforated/damaged the flowing resin emerges from the inner intermediate layer and flows together at the corresponding site and seals.

5. Incorporation of at Least One Swelling (Intermediate) Layer.

When the sheet is perforated/damaged, water enters and leads to swelling of the inner intermediate layer, and thus, to sealing. In doing so, the effect is the same as in alternative number 3.

6. Use of an Elastic Layer as Sealing Layer.

When a fastener (for example, a nail) is inserted, a layer of an elastic layer material surrounds the fastener, presses radially against it and seals in the region of the fastener. In conjunction with the elastic layer as the sealing layer, there are, among others, the following possibilities:

a) The sheet is formed of a multilayer composite of individual function layers. The sealing layer is made preferably of an elastomer. In this connection, both conventional and also thermoplastic elastomers are possible for use as the layer material. During elongation or under pressure, elastomers briefly change their shape, and after stress, return to their original shape. This effect is used for permanent sealing between the sealing layer and the perforation medium.

b) The sheet as the sealing layer has at least one layer of a closed-cell elastic foam. Here, the restoring force of the elastic material is also used. It is even possible to combine several function layers in only one single layer.

c) A layer of a viscoelastic gel is used as the sealing layer.

It is pointed out, first of all, that the aforementioned alternatives can each be used by itself or also in any combination with one another. Thus, for example, microcapsules according to alternative 1 can be provided in conjunction with a flowing intermediate layer according to alternative 4 and/or a supplementary elastic layer according to alternative 6. However, this is only one example of the possible layer structures.

In conjunction with the alternatives of an elastic layer as a sealing layer in accordance with the invention as mentioned under 6a) the following features by themselves or in any combination acquire importance:

- There is a multilayer composite of the sealing layer and at least one other layer, especially of at least one membrane and/or at least one mechanical protective layer.
- The membrane has the function of a water vapor-permeable film or foam film, made preferably of thermoplastic elastomers such as thermoplastic polyurethanes (TPE-U) or thermoplastic polyester elastomer (TPE-E), thermoplastic polymers, such as, for example, polypropylene (PP), cellophane (cellulose film) or a water vapor-permeable coating, for example, based on polyurethane or acrylate or another water vapor-permeable layer of another type.
- The layer thickness of the membrane is between 10 µm and 1000 µm, any individual value and any intermediate interval being fundamentally possible even if this is not specifically mentioned.
- The layer composite, i.e., the sheet, as such, ensures watertightness and is made such that it withstands a hydrostatic water pressure of greater than 100 mm, preferably greater than 200 mm, furthermore preferably, greater than 1000 mm and even more preferably greater than 1500 mm. Here, any individual value within the indicated ranges is also possible.
- The sealing layer is designed for sealing to the perforation medium which is, for example, a nail.
- The sealing layer made preferably of elastic materials, such a films, foams, nonwovens, knits or woven fabrics.
- The material of the sealing layer is especially conventional and thermoplastic elastomers.

Among conventional elastomers are all types of synthetic and natural rubbers which can be irreversibly chemically crosslinked. The crosslinking takes place, for example, by vulcanization with sulfur, by means of peroxides or metal oxides. Examples for conventional elastomers are natural rubber (NR), acrylonitrile-butadiene rubber (NBR), styrene-butadiene rubber (SBR), chloroprene rubber (CR), butadiene rubber (BR) and ethylene-propylene-diene rubber (EPDM).

Thermoplastic elastomers (TPE) are elastomers which are reversibly chemically crosslinked. At room temperature they show behavior similar to conventional elastomers. At elevated temperatures the physical crosslinking is cancelled so that these elastomers show a typical processing behavior of thermoplastics. Thermoplastic elastomers include elastomer alloys/polymer blends having polyolefins and uncrosslinked or partially crosslinked types of rubber (TPE-V, TPE-O) and also multiblock polymers (TPE-E, TPE-A, TPE-U, TPE-S).

Materials of the sealing layer are especially thermoplastic polymers such as PE, PP, PET, EVA, PA in crosslinked or uncrosslinked form, thermoplastic elastomers (TPE) such as for example, TPE-U, TPE-S, TPE-A, TPE-O or TPE-E, elastomers such as EPDM or natural rubber.

The weight per unit of area of the sealing layer is between 10 and 3000 g/m$^2$, preferably between 50 and 500 g/m$^2$, any individual value and any intermediate interval within the indicated range boundaries being possible.

The layer thickness of the sealing layer is between 10 µm and 3000 µm, any individual value and any intermediate interval within the range boundaries being possible. The layer thickness is conventionally greater than 50 µm, preferably greater than 150 µm, and more preferably is between 250 to 800 µm.

The modulus of elasticity of the material of the sealing layer is between 0.001 and 20 kN/mm$^2$, preferably between 0.005 and 1 kN/mm$^2$, in this case, any individual value and any intermediate interval within the range boundaries also being possible.

The restoring force of the material of the sealing layer is in the range between 1 and 2000 N/5 cm, preferably, between 20 and 500 N/5 cm, here, any individual value within the range boundaries being possible.

Depending on the material and layer thickness, the elastomer layer can, fundamentally be open to diffusion or closed to diffusion. Thermoplastic elastomers such as representatives of the elastomer types TPE-E, TPE-A and TPE-U are already open to diffusion in films of a certain thickness, i.e., they have a watertight but water-vapor permeable nature.

In other elastomer types such as conventional elastomers and some representatives of thermoplastic elastomers (TPE-O, TPE-V and TPE-S) or in the case of insufficient vapor diffusion, for example, due to the layer thickness, the diffusion-open property can be ensured by an additional planar perforation. This can take place in particular by mechanical or electrostatic perforation, by heat perforation, laser perforation and/or water jet perforation and/or punching of the film. The mechanical perforation or punching takes place for example, by needle materials, roll materials, plate or sheet materials and can thus have different hole shapes.

The sealing layer or the material of the sealing layer has a water vapor permeability (WDD) between 10 and 10,000 g/m$^2$d. Here, any individual value and any intermediate interval within the range boundaries are also possible.

The material of the sealing layer can by nature have an open-pore character (intrinsic) and can be made, for example, as a nonwoven, woven fabric or knit.

Alternatively, an open surface portion can be generated by punching or needle perforation. The portion of the open surface in the total area can be between 2% and 85%, preferably, between 10% and 60%. In this case, any individual value and any intermediate interval within the range boundaries are also possible.

It is decisive that the diameter of the hole of the perforation or the mesh width of the woven fabric/knit/nonwoven be below the diameter of the perforation medium. The diameter of the hole of the perforation or the mesh width should be between 10 mm and 4 mm, preferably, less than 2 mm, and especially, in the range from 0.1 to 2.0 mm, here also, any individual value and any intermediate interval within the range boundaries being possible.

In order to achieve an optimum sealing effect, the diameter of the holes of the perforations should, preferably, be less than 90% of the diameter of the fastener, preferably less than 75%, and more preferably, in the range less than 50%.

In order to guarantee watertightness in an elastic layer with a large-pore perforation, additional backing/coating with a diffusion-open layer can be done. Other backings or coatings, for example, with layers of nonwovens, can contribute to planar stability of shape of the film.

Furthermore, there is at least one mechanical protective layer which is designed mainly to protect the membrane against mechanical damage, such as for example, by wood splinters during perforation by nailing or screwing. Preferably, there are two protective layers which are located on the outer side, and thus, also the elastic sealing layer is protected against unnecessary mechanical damage.

The mechanical protective layer can be made of nonwoven fabrics, woven fabrics, knits, films and/or open-cell or closed-cell foamed films.

Materials for the mechanical protective layer can be thermoplastic polymers such as, for example, PE, PP, PET, EVA, PA in crosslinked or uncrosslinked form, thermoplastic elastomers such as for example, TPE-U, TPE-S, TPE-A, TPE-O or TPE-E, elastomers such as ethylene propylene diene monomer (EPDM) or natural rubber, but also natural or semi-synthetic materials, such as, for example, cotton, hemp, jute or viscose. Materials as blends of the aforementioned materials are also possible.

The density of the material of the protective layer is between 1 and 2200 kg/m$^3$, preferably between 5 and 500 kg/m$^3$, any individual value and any intermediate interval within the range boundaries also being possible here.

The layer thickness of the mechanical protective layer is between 30 μm and 3000 μm, any individual value and any intermediate interval within the range boundaries also being possible here.

The weight per unit of area of the mechanical protective layer is between 10 and 1000 g/m$^2$, preferably between 50 and 500 g/m$^2$, with any individual value and any intermediate interval within the range boundaries also being possible here.

It goes without saying that the protective layer must be water vapor-permeable when the sheet, therefore the composite, is used as a water vapor-permeable underlay sheet. In this case, the water vapor permeability (WDD) should be between 10 and 3000 g/m$^2$d, preferably, between 100 to 1500 g/m$^2$d, with any individual value and any intermediate interval within the range boundaries being possible.

The individual layers of the multilayer composite, which is preferably provided in the sequence protective layer—membrane—sealing layer—protective layer, are joined by bonding, cement backing, extrusion coating or dispersion coating. Combinations of the methods are also easily possible. Thus, for example, adjacent layers can first be connected to one another by a certain method, and then, other layers can be connected to the pertinent prelaminate via another method.

The technique of joining the layers must be matched to the application. If the sheet is being used as a water vapor-permeable composite, the joining of the layers should not, at least largely should not, adversely affect the water vapor permeability. The water vapor permeability of the multilayer composite should be between 10 and 3000 g/m$^2$d, preferably, between 100 to 1500 g/m$^2$d, with any individual value and any intermediate interval within the range boundaries being possible.

In the alternative named under 6b), the sealing layer is made in the form of a foam layer of a closed-cell elastic foam. The following features by themselves or in combination can also be implemented in conjunction with other aforementioned features:

The foam layer can be part of a multilayer composite, as has been described above. Reference is made expressly hereto.

However, it is also fundamentally possible for several function layers to be combined in the foam layer. Thus, for example, a foamed TPE-U or TPE-E or even other layers can at the same time assume the function of the mechanical protective layer and/or the membrane and/or one or even several sealing layers.

The material of the sealing layer is preferably a polymer foam layer which forms the seal to the fastener or the perforation means when the sheet is perforated/damaged.

The polymer foam can consist of thermoplastic elastomers or blends, preferably of water vapor-permeable TPE-U or TPE-E which are foamed with chemical or physical propellants or by gases such as air, nitrogen, and/or carbon dioxide.

The density of the material of the foam layer is between 1 and 2200 kg/m$^3$, preferably between 5 and 500 kg/m$^3$, with any individual value and any intermediate interval within the range boundaries being possible.

The layer thickness of the material of the sealing layer is between 30 μm and 5000 μm, any individual value and any intermediate interval within the range boundaries being possible.

The weight per unit of area of the foam layer is between 10 and 1000 g/m$^2$, preferably between 50 and 500 g/m$^2$, with any individual value and any intermediate interval within the range boundaries being possible.

The water vapor permeability (WDD) is between 10 and 3000 g/m$^2$d, preferably between 100 to 1500 g/m$^2$d, with any individual value within the range boundaries being possible.

The modulus of elasticity of the material of the sealing layer is between 0.01 and 20 kN/mm$^2$, preferably between 0.05 and 1 kN/mm$^2$, here any individual value and any intermediate interval within the range boundaries also being possible.

In the implementation of a foamed elastomer layer, a perforation as mentioned above is otherwise possible. Here, the cell or pore diameter of the foam material should be smaller than the expected hole diameter due to the fastener. Preferably, alternatively, open-pore elastomer foam can be used, and thus, an additional perforation can be omitted.

In the embodiment described under 6c) the use of a viscoelastic gel as an elastic layer or sealing layer is provided. When the sheet is perforated or damaged, the flexible and highly elastic gel is displaced into the surface. In contrast to purely viscous media as described in the embodiment according to number 2, or a purely elastic layer, i.e., the use of an ideal elastomer, viscoelastic materials cover the transition region in which the properties of the two materials apply.

Even if an intermediate layer of a viscoelastic gel is not an ideal elastomer, it is still subsumed under the term "elastic layer".

Due to their stability of shape, viscoelastic materials, such as gels, try to return to the initial shape and compared to pure elastomers thus provide for an additional flowing seal to the fastener or the perforation means. In this way, the viscoelastic gel has self-adhesive properties, and thus, provides for a further bond to the fastener/perforation means.

In conjunction with the use of a sealing layer of a viscoelastic material, the following features for themselves or in any combination with the aforementioned features of the other alternatives can also be used with one another:

Fundamentally, the sealing layer of a viscoelastic gel can be integrated in a multilayer composite according to alternative 6a), the layer of elastic material, as such, then being replaced by the gel layer. Reference is made expressly to the above described features.

The viscoelastic gel for the sealing layer can also be binary or single-component polyurethane systems, silicone gels or PMMA-based gels.

Instead of the aforementioned layer composites, the viscoelastic intermediate layer can also be combined with one or more (carrier) layers in order to increase stability.

The carrier layers can be films, nonwovens, woven fabric, knits of materials such as thermoplastic polymers, for example, PE, PP, PES, EVA or the like.

The gel film can be applied to a carrier, for example, by spraying, doctoring or rolling.

The degree of hardness of the viscoelastic gel is in the range of Shore A 15 to Shore A 30, any individual value and any intermediate interval within the range boundaries being possible.

The application weight of viscoelastic gel in the sealing layer is between 50 and 1000 g/m², preferably, in the range between 100 and 400 g/m², with any individual value and any intermediate interval within the interval limits being possible.

To reduce the weight of the gel layer, fillers whose weight is less than that of the gel, such as, for example, hollow microspheres, can be used, or loading with air or other gases can be performed.

The water vapor permeability of the gel layer, when the layer composite is to be completely permeable to water vapor, is between 10 and 3000 g/m²d, preferably, between 100 and 1500 g/m²d, any individual value and any intermediate interval within the range boundaries being possible.

Fundamentally, the self-adhesive nature of the gel can also be used to cement the film sheets among other another. Thus, in the region of the edge of the sheet above the gel layer, the outer protective/carrier layer can be shortened on the side of the longitudinal edge so that a longitudinally running outer edge strip of the gel layer arises which is preferably covered by means of a protective film, for example, in the form of a polyurethane film or a polyurethane-enamel system. The protective film is removed for installation so that, on the edge side, the self-adhesive surface appears over which the following sheet can be cemented.

In this connection, it is fundamentally possible, on the opposing longitudinal edge, on the same or the other side of the sheet, to provide a corresponding formation in which the gel layer except for the protective film is likewise exposed on the edge side.

In all embodiments of the alternatives according to number 6, preferably, the following is provided by itself or in combination with one another or other of the aforementioned features:

The characteristic for the amount of sealing (MDA) of the sealing layer computed from the product of the restoring force $F_r$ [N/5 cm] and the thickness of the sealing layer d [μm] according to the following formula $$MDA = F_r \times D$$

is between 3 N/5 cm×μm and 10000 kN/5 cm×μm, and preferably, between 10 N/5 cm×μm and 5000 kN/5 cm×μm and especially between 50 N/5 cm×μm to 2000 N/5 cm×μm, with any individual value within the indicated value range being possible.

Preferably, the restoring force of the sealing layer should be in the range between 0.1 and 2000 N/5 cm, preferably, between 20 and 500 N/5 cm, with any individual value and any intermediate interval within the range boundaries being possible.

Furthermore, it is pointed out that, especially for alternatives 1 to 3, it is also possible to use corresponding unencapsulated material particles instead of microcapsules. In this connection, it should then be provided that these particles are embedded into the matrix of the sheet body, therefore are not freely accessible on the outside. Accessibility, and thus, the possibility of a reaction arise only in the case of a perforation. In this case, then, the reaction partners can be air or water. Therefore, it is also important that the microparticles, which preferably are made of a solid material in the unperforated state of the sheet, are completely incorporated into the sheet matrix and are not accessible on the outside.

In conjunction with the layers according to alternatives 4 and 5, it is pointed out that it is fundamentally possible, according to the execution of the microcapsules with different reaction partners, to provide two inner reaction layers which are then separated from one another via a separating layer. In the case of a perforation or damage to the sheet, the reaction partners of the individual layers, which have been separated beforehand via the separating layer, become joined to one another so that the above described reaction can occur.

Otherwise, it goes without saying that the above described sealing function layers, regardless of whether they are made as an intermediate layer or contain microcapsules or microparticles, can be combined with any other layers. The sheet body can therefore be easily built up from a multilayer material.

The chemical basis of the microencapsulated adhesives (core materials) is, for example, acrylates, polyesters, epoxy resins or polyurethanes.

A dedicated choice of the wall material, the core material and the method for microencapsulation can influence the desired properties of the microcapsules, such as the capsule diameter and wall thickness. Wall material and wall thickness are important characteristics for the mechanical, thermal and chemical stability. They also determine whether the core material is continuously or preferably suddenly released and dictate the storage stability of the material.

Thus, depending on the encapsulation technique which has been used, capsule diameters between 0.1 and 300 μm, preferably between 1 to 100 μm and especially between 10 and 50 μm can be used. Fundamentally, typical wall materials, such as, for example, amino resins, polyamides, polyurethanes, polyureas, polyacrylonitrile or gelatins are available.

The method used for producing sheets, such as extrusion, casting, coating or fiber spinning must be matched to the size and the stability of the microcapsules or particles, so that a premature release of the core material by excess mechanical, thermal or chemical stress in the sheet production process is avoided.

Furthermore, it must be considered that the concentration of the capsules (average number of capsules per unit of area) is chosen such that, in the case of diffusion-open sheets, the diffusion capacity of the sheet in the required magnitude is maintained.

Ageing of the sheet under the conditions which correspond to the application should not lead to damaging of the wall material of the capsules, and thus, to a planar distribution of the adhesive and to an associated general adverse effect on the diffusion capacity of the sheet.

Locally destroying the capsules and achieving the accessibility of the embedded parts or layers should only take place by relatively high mechanical pressure, for example, by perforation and damage as a result of nailing-through.

The adhesive which is released from the damaged capsules after the curing process establishes a water-impermeable bond to the perforation medium.

Swellable materials are preferably polymers of acrylic acid/acrylic salts (superabsorbers) and/or bentonites. However, polyurethanes, polyether esters, polyether block amides, polyacrylic acid esters, ionomers and/or polyamides with corresponding water absorption are also suitable.

The water absorption of the swellable materials at 23° C. in water when using superabsorbers and bentonites is between 10-1000 times. The water absorption for other polymers, especially for intermediate layers, is between 1 and 30%, preferably, between 3 and 15%, and more preferably, between 5 and 10%.

In one special case, the microcapsules are worked into a polymer (homopolymers or copolymers of polyethylene, polypropylene or polyester), this mixture is extruded and then stretched. In doing so, a microporous, diffusion-open membrane (breathable film) with self-sealing properties is formed. Some of the microcapsules can be replaced by conventional fillers such as chalk, talc, marble, limestone, titanium oxide or quartz powder.

The weights per unit of area of the sealing function layers or of the microcapsules/particles for an at least essentially uniform distribution over the surface of the sheet or in the diffusion-open case are between 5 to 150 g/m$^2$, preferably, 10 to 100 g/m$^2$, and more preferably, 20 to 80 g/m$^2$. The respective weight per unit of area can depend especially on the respective application. Conversely the total weight per unit of area, i.e., the weight of the matrix material of the sheet body including the weight per unit of area of the sealing function layer/microcapsules/particles in the diffusion-closed case is between 30 to 1000 g/m$^2$, preferably, 50 to 500 g/m$^2$ and more preferably 100 to 300 g/m$^2$.

The concentration of the capsules/particles is between 5 to 70%, preferably, 10 to 50% and furthermore 20 to 30%. The aforementioned percentages can relate especially to the volume (% by volume) and also the weight (% by weight).

The sheet in accordance with the invention can be both open to diffusion and also closed to diffusion. For sheets open to diffusion, the sd value is in the range between 0.01 to 0.5 m, preferably, between 0.01 to 0.3 m, and furthermore, 0.02 to 0.15 m. In the diffusion-closed version, the sd value is between 0.5 to 1000 m, preferably, between 2 to 200 m.

In conjunction with this invention, it has otherwise been ascertained that the watertightness of the sheet in accordance with the invention after perforation with a nail or a screw is such that there is a tightness for a static water column>200 mm, preferably >500 mm, especially preferably >1000 mm, and furthermore, preferably, >1500 mm. Depending on the type and amount of the function material, the ratio of the watertightness of the sheet in accordance with the invention after perforation to the undamaged sheet is greater than 50%, preferably, greater than 70% and more preferably, greater than 90%. Ultimately, the invention can ensure almost a watertightness as in an undamaged sheet.

The sheets or strips of all alternatives outfitted, in this way, preferably, are used in the sealing of buildings, especially in the diffusion-open version, as an underlay sheet or as a facade sheet.

The diffusion-closed sheets are used as vapor brakes, vapor barriers, gas barriers (for example, against radon, methane), masonry barriers and vertical (walls) and horizontal seals (floors, flat roofs).

It is expressly pointed out that all of the aforementioned range data comprise all individual values and all intermediate values within the indicated range limits, even if they are not given in particular. All unnamed individual values and intermediate ranges are regarded as encompassed by the invention.

Exemplary embodiments of the invention are described below. All described and/or illustrated features by themselves or in any combination form the subject matter of this invention.

DETAILED DESCRIPTION OF THE INVENTION

Figure 1:
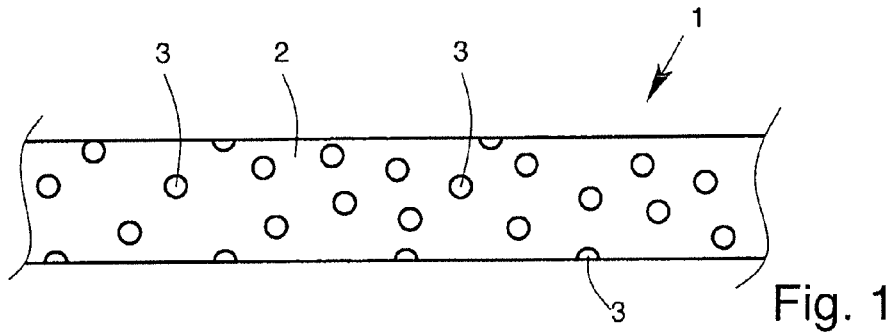
FIG. 1 is a schematic depiction of a first embodiment of a sheet in accordance with the invention.
Figure 2:
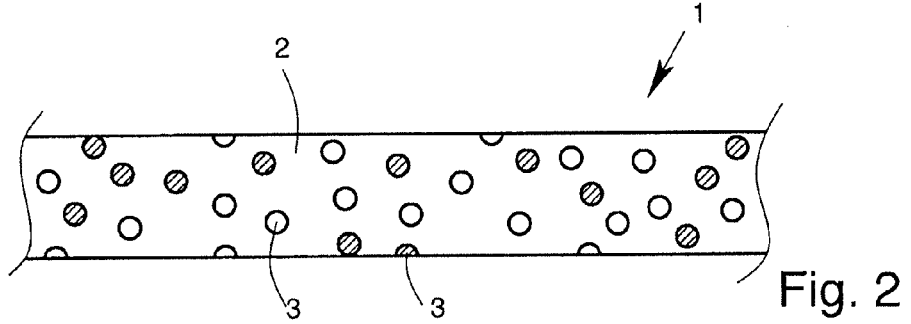
FIG. 2 is a schematic depiction of a second embodiment of a sheet in accordance with the invention.

FIGS. 1 & 2 as well as FIGS. 4 to 10 each show a respective embodiment of sheets 1 which are intended for use in the building sector. The sheets 1 can be, for example, sealing or facade sheets, air barriers and vapor barriers. Depending on the application, the sheets 1 can be open to diffusion or closed to diffusion. Here, the term "sheet" also includes strips or film products. In any case, the sheet 1 has a planar sheet body 2 which has an extrudable or castable plastic as a matrix material. Conventionally, the sheet body 2 has an elongated shape and is wound up when not in use for handling purposes. The length of the sheet body 2, the width and the thickness are dependent on the application. Conventional thicknesses of the sheet body 2 are between 100 and 300 µm, and the thickness range can vary fundamentally between 50 µm and 2000 µm, any individual values between the aforementioned range limits being fundamentally possible.

In all embodiments, it is such that the sheet body 2 contains a material which is inactivate when not in use and which can be activated, and which, in the case of a perforation of the sheet body 2, emerges from the sheet body 2, and in doing so, is intended for closing or for sealing the perforation opening.

FIGS. 1 & 2 as well as FIGS. 4 to 7 show different embodiments of sheets 1. In the embodiment as shown in FIG. 1, in the matrix material of the sheet body 2 there are microcapsules 3 which contain a single-component adhesive. When the sheet body 2 is perforated by a fastener 4, for example, in the form of a nail, the microcapsules 3, which are located in the region of the perforation, are destroyed. In doing so, the adhesive emerges from the capsules 3. Then, the adhesive can set physically or chemically. Reaction partners can be, for example, water which is penetrating from the outside, oxygen and/or reactive groups of the surrounding matrix material. Ultimately, a seal 5 (FIGS. 8-10) is formed by the adhesive being released in the region of the perforation opening between the fastener 4 and the matrix material of the sheet body 2; the seal 5 seals the annular perforation opening between the fastener 4 and the surrounding matrix material of the sheet body 2. In doing so, it can also be otherwise provided that the adhesive of the microcapsules 3 reacts with the material of the fastener 4 so that seal 5 occurs in that way.

Figure 8:
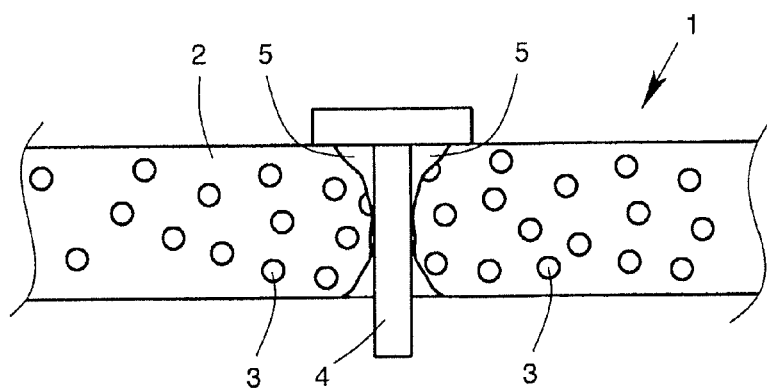
FIG. 8 is a schematic depiction of the sheet from FIG. 1 in the perforated state.

In the embodiment according to FIG. 2, there are two different types of microcapsules 3 which are identified here as light and dark. The two types of microcapsules 3 contain different reaction partners. When a fastener 4 is inserted, the microcapsules 3 are destroyed and the reaction partners emerge. In doing so, then, there is a reaction forming corresponding seal 5, as is shown in FIG. 8.

Figure 3:
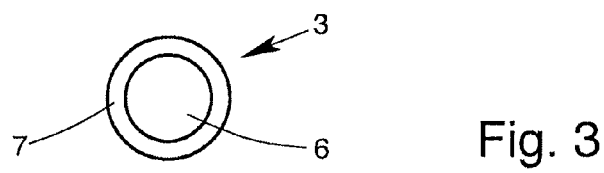
FIG. 3 is a schematic depiction of a microcapsule.

FIG. 3 schematically shows a microcapsule 3. It has a core 6 of a first material and a shell 7 of a second material. The first material can be a resin, the second material a curing agent.

Figure 4:
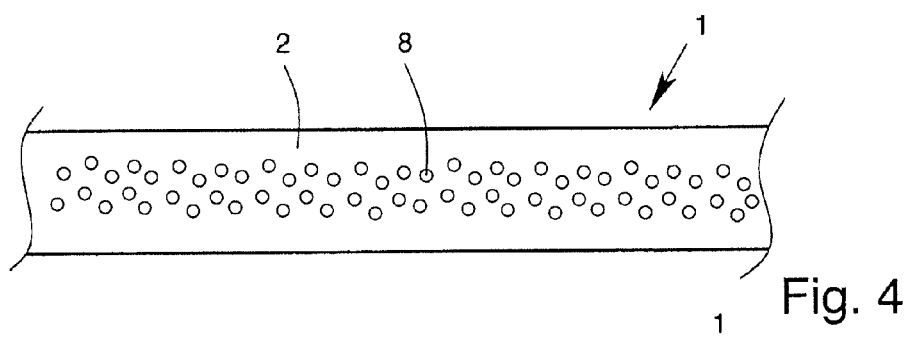
FIG. 4 is a schematic depiction of a third embodiment of a sheet in accordance with the invention.

FIG. 4 shows an embodiment in which, instead of using microcapsules, solid particles 8 are embedded into the matrix material of the sheet body 2. The particles 8 are a comparatively solid or grainy material. Since the particles 8 react when air and/or water enters, they are not located on the outside of the sheet body 2, but in the middle region so that an unintentional reaction is precluded. A reaction takes place only when the sheet 1 is perforated.

Figure 5:
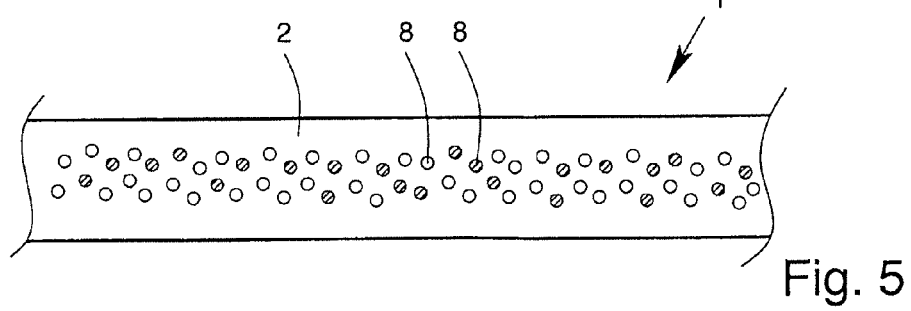
FIG. 5 is a schematic depiction of a fourth embodiment of a sheet in accordance with the invention.

FIG. 5 shows an alternative embodiment in which there are different particles 8 which are, likewise, embedded in the middle region of the matrix material of the sheet body 2. The different particles are identified as light and dark. A reaction of the particles 8 of the different materials takes place only when air and/or water enters; this occurs only when the sheet 1 is perforated.

Figure 6:
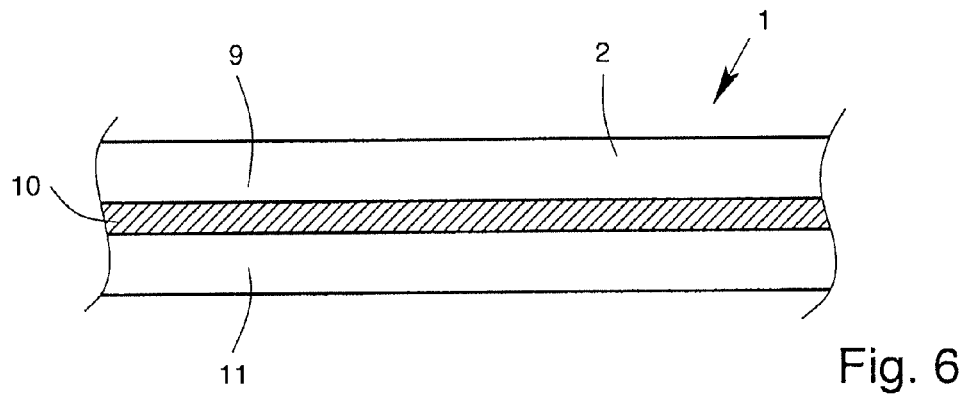
FIG. 6 is a schematic depiction of a fifth embodiment of a sheet in accordance with the invention.
Figure 10:
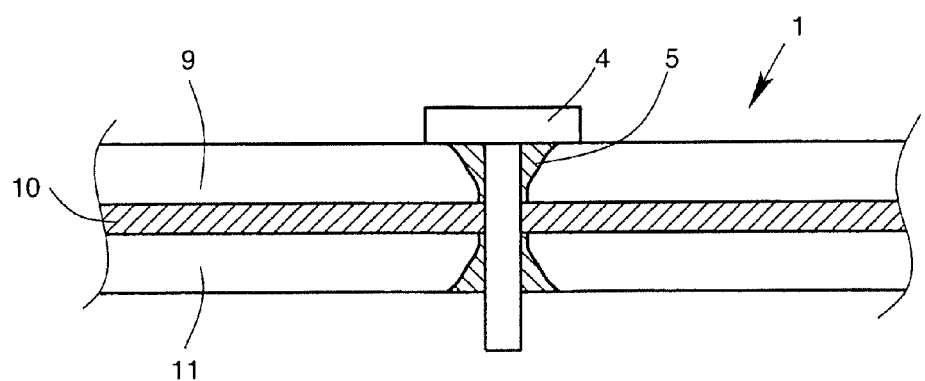
FIG. 10 is a schematic depiction of the sheet from FIG. 6 in the perforated state.

FIG. 6 shows an embodiment in which the sheet body 2 is built up in layers. Here, there are three layers, specifically an upper layer 9, an intermediate layer 10 and a lower layer 11. The sealing/swelling material is located in the inner intermediate layer 10. The intermediate layer 10 can have a layer thickness between 0.1 to 300 µm, preferably between 1 to 100 µm and especially between 10 and 50 µm. When the sheet 1 is perforated by a fastener 4, as is shown in FIG. 10, the material of the intermediate layer 10 emerges in the region of the perforation opening, and in doing so, fills the region between the fastener 4 and the surrounding matrix material of the sheet body 2 so that a seal 5 is formed there, as is shown in FIG. 10.

Figure 7:
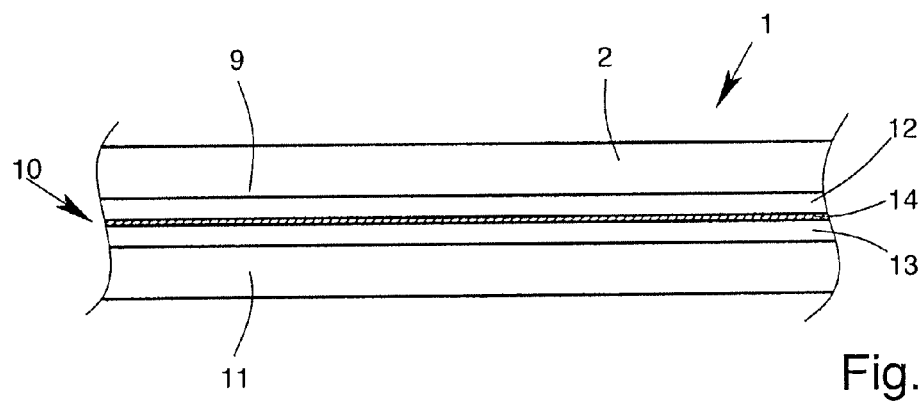
FIG. 7 is a schematic depiction of a sixth embodiment of a sheet in accordance with the invention.

FIG. 7 shows an embodiment in which the sheet body 2 is made with five layers. Here the reactive intermediate layer 10 is composed of two reaction layers 12, 13 and one separating layer 14 which is provided between the reaction layers 12, 13 and which separates them. When the sheet body 2 is perforated the separating layer 14 is also perforated so that the materials of the reaction layers 12, 13 react with one another and can assume their self-sealing or self-healing function in the region of the perforation opening.

Figure 9:
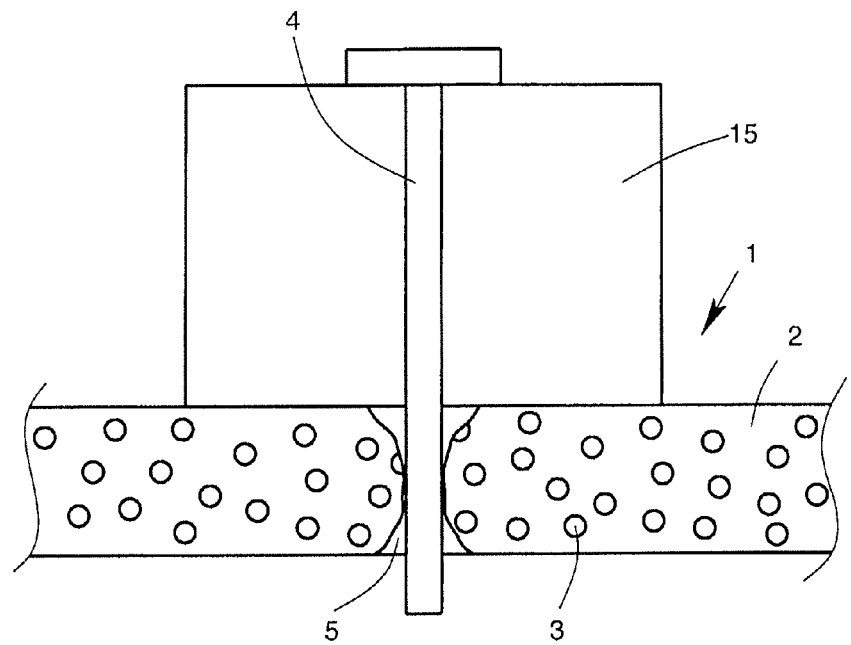
FIG. 9 is a schematic depiction of the sheet from FIG. 1 with a counter lath in place in the perforated state.

FIG. 9 shows a situation as often occurs in the roof region. Wood 15, for example, a counter lath which is connected to the undersurface via a fastener 4, is placed on the sheet 1. The fastener 4 goes through the wood 15 and the sheet 1. In doing so, then, the effect of seal 5 shown in FIG. 8 arises via the material of the microcapsules 3 which has been destroyed during the perforation, the sealing 5 taking place between the fastener 4 and the surrounding matrix material of the sheet body 2 and in the region of the wood 15.

In all embodiments, it is otherwise such that the microcapsules 3/microparticles are distributed at least essentially uniformly over the base surface of the sheet body 2. On the edge side, there should be no access to the capsules 3/particles or exposure.

Figure 11:
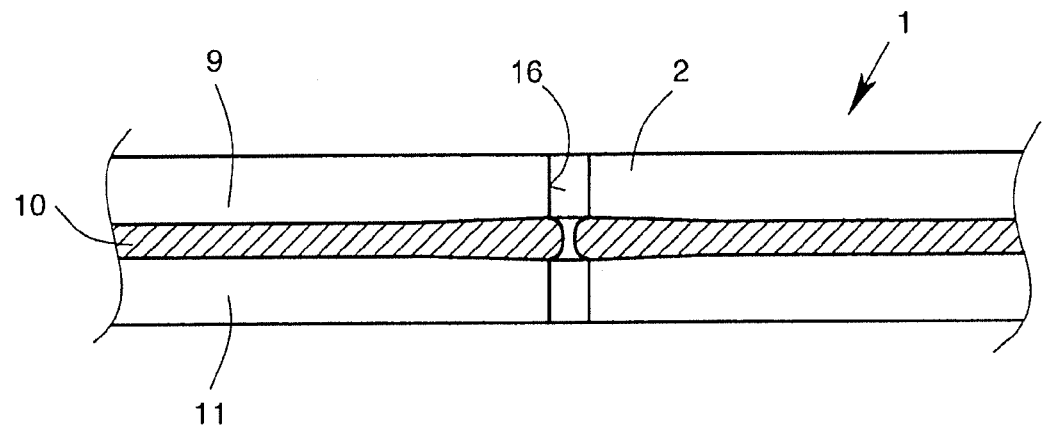
FIG. 11 is a schematic depiction of a seventh embodiment of a sheet in accordance with the invention without fasteners.

FIG. 11 shows one embodiment of a sheet 1 which has an intermediate layer 10 of a swelling material. The sheet body 2 is perforated, therefore has a perforation 16. Air and/or water travels through the perforation 16 to the swelling material of the intermediate layer 10 so that this material swells into the perforation 16 and reduces the free diameter of the perforation relative to the diameter in the upper layer 9 or the lower layer 11. The swelling of the material therefore provides for a narrowing of the cross section of the perforation which can even proceed so far that the perforation 16 in the region of the intermediate layer 10 is completely closed.

Figure 12:
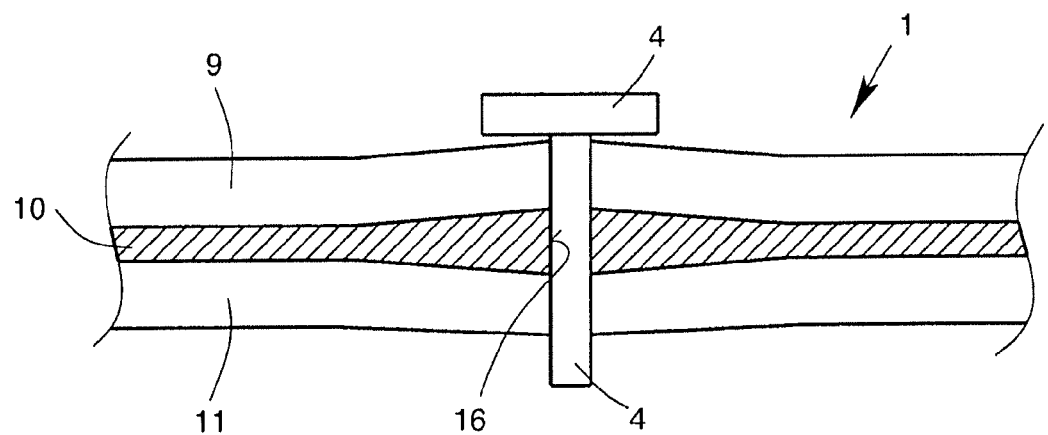
FIG. 12 is a schematic depiction of the sheet from FIG. 11 with fasteners.

FIG. 12 shows an exemplary embodiment in which the fastener 4 is located in the perforation 16. The material of the intermediate layer 10 has expanded in the region of the perforation opening or of the fastener 4 and presses against the fastener 4 which penetrates the sheet body 2. In the region of the perforation 16, the intermediate layer 10 thickens due to the swelling of the material in the intermediate layer 10.

Figure 13:
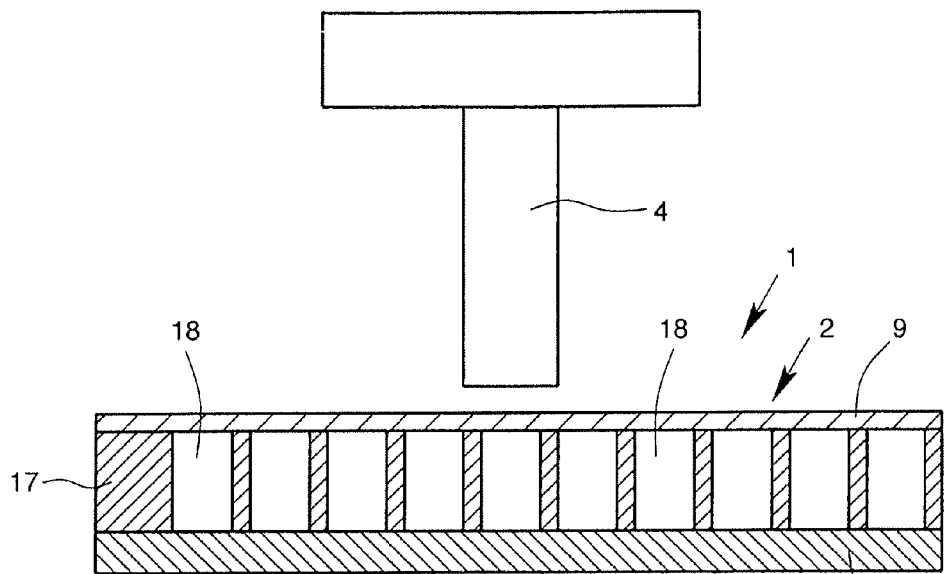
FIG. 13 is a schematic depiction of an eighth embodiment of a sheet in accordance with the invention.
Figure 14:
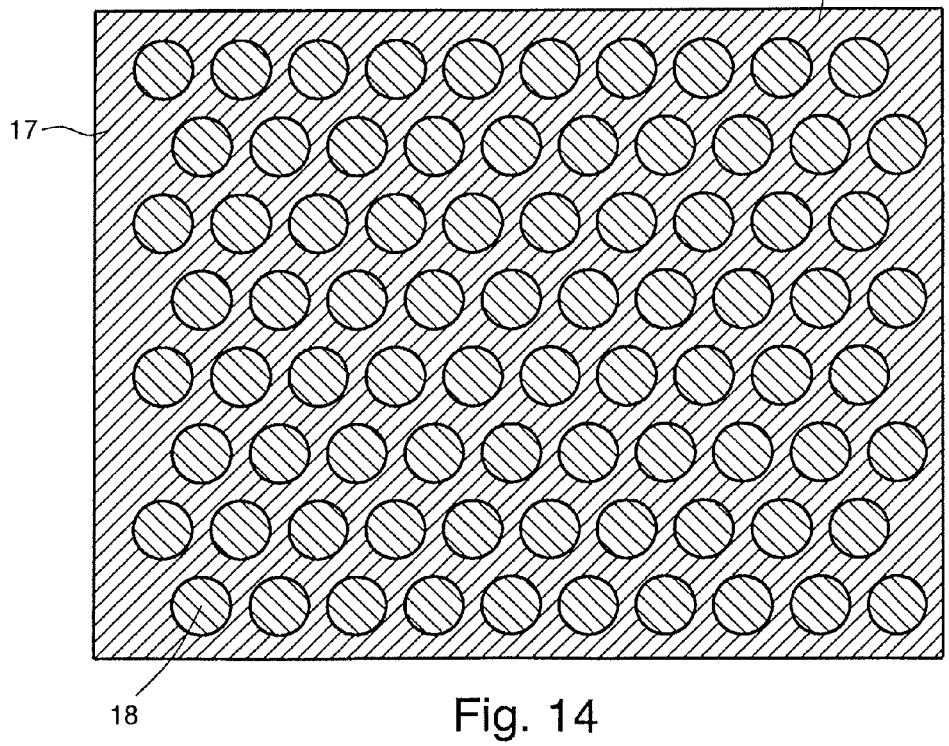
FIG. 14 is a top view of the sheet from FIG. 13, with the uppermost layer removed.

FIGS. 13 and 14 show another embodiment of the sheet 1 in accordance with the invention. The sheet body 2 here has an elastic layer as the sealing layer 17 which is provided with a plurality of through openings 18. The diameter of the through openings 18 is smaller than the diameter of the fastener 4. Since the through openings 18 have relatively large pores, the sheet body 2 has an upper layer 9 which is open to diffusion but which can also be closed to diffusion. Moreover, there is a lower layer 11 which can be, for example, a nonwoven layer which contributes to the planar stability of shape of the sheet body 2.

If the sheet 1 is penetrated by the fastener 4, due to the elastic properties of the elastic layer material and the use of through openings 18 whose diameter is smaller than the diameter of the fastener 4, there is sealing contact of the elastic material with the fastener 4.

It goes without saying that, for certain applications, it is fundamentally possible for the sheet body 2, when using an elastic or sealing layer 17, to be made only with one layer, so that it has only the sealing layer 17. Fundamentally, the through openings 18 can also be omitted. For diffusion-open applications, the embodiment shown in FIG. 13 should be chosen, the lower layer 11 not being unconditionally necessary as a stability or support layer.

Figure 15:
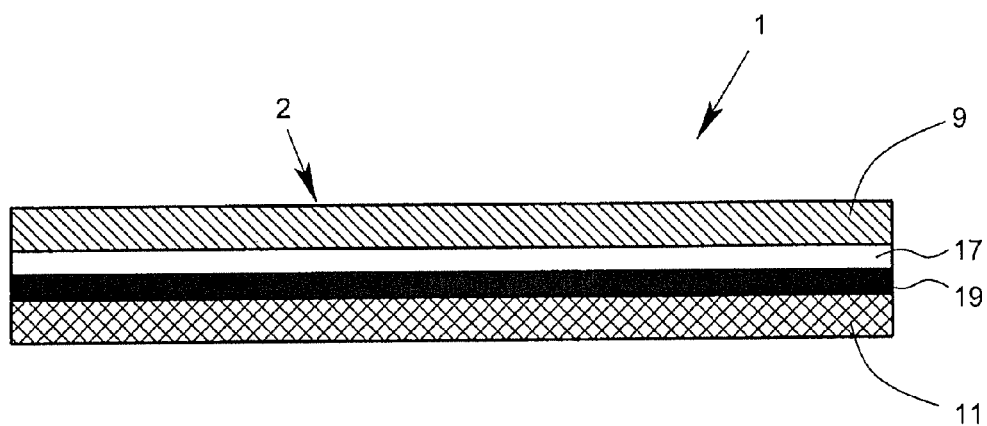
FIG. 15 is a schematic cross sectional view of another embodiment of a sheet in accordance with the invention and FIG. 16 is a perspective partial view of another embodiment of a sheet in accordance with the invention.

FIG. 15 shows an embodiment of a sheet 1 in which the sheet body 2 is made as a multilayer composite. There are an upper layer 9 and a lower layer 11 each of which forms a mechanical protective layer. Between the two protective layers 9, 11, there are a sealing layer 17 and a membrane layer 19.

Otherwise, sheets are also possible in which the structure of the film composite is different.

Thus, the following exemplary embodiments of sheets and their respective production which are also possible.

Film Composite 1

A silicone gel of 50 μm is applied by means of a doctor blade to a calendared PP nonwoven material with a weight per unit of area of 150 g/m² and is laminated with a TPE-E film 90 μm thick.

Film Composite 2

A TPE-U film of 119 μm is extruded between two viscose nonwoven materials of 120 g/m² weight per unit of area each.

Film Composite 3

An EPDM film which has been perforated with holes (hole diameter 2 mm, open area 70%) is extrusion-coated with a TPE-E membrane of 134 g/m². Then, cement lamination onto the membrane side is done with a heat-calendered PET nonwoven material.

Film Composite 4

A perforated PP foam film 200 μm thick with an open area of 47% is extrusion coated with a TPE-E membrane of 91 μm. This composite is cement-laminated on both sides with PP nonwovens of 120 g/m² each.

Film Composite 5

A mixture of an adhesive and superabsorber-filled microcapsules is applied to a PP nonwoven material that is 89 μm thick and then cemented by means of a second PP nonwoven material that 67 μm thick.

Figure 16:
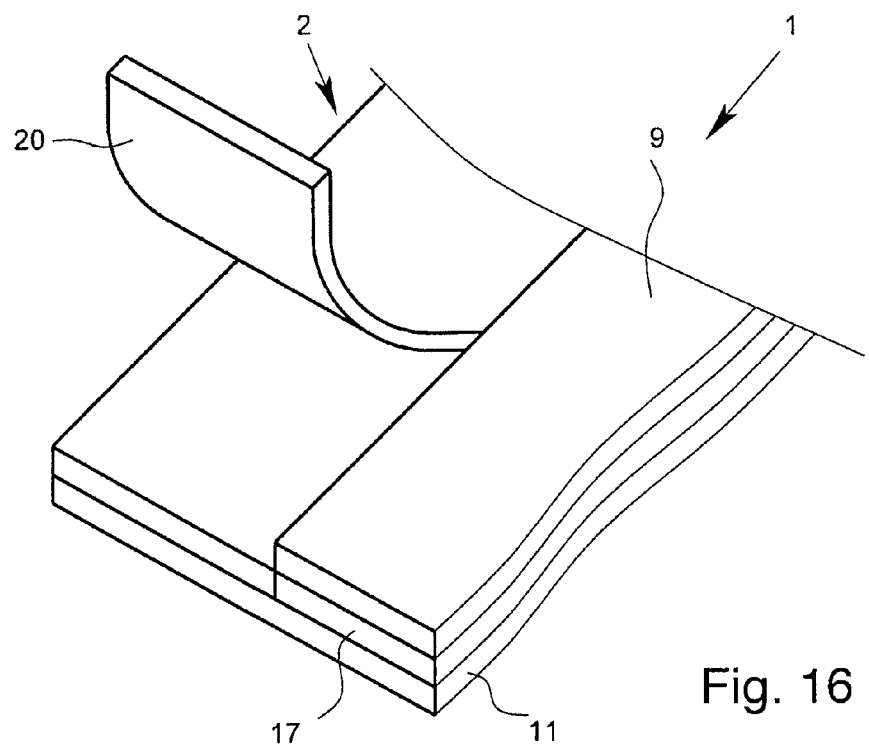

FIG. 16 shows an embodiment in which the sealing layer 17 is located between an upper layer 9 and a lower layer 11 which each form carrier layers. The three-ply layer composite of the sheet 1 is shortened on at least one longitudinal edge in the region of the upper layer 9. In the same way, the lower layer can be shortened on the opposite longitudinal edge. The sealing layer 17 is made of a viscoelastic gel which has self-adhesive properties. On the exposed edge region of the gel layer, there is a covering protective film 20 which is pulled off for installation of the sheet. The self-adhesive properties of the gel layer 17 easily enable cementing of the sheet to an adjacent sheet in the edge region. In this embodiment, the sealing layer 17 has a dual function, specifically, on the one hand, the sealing action in the case of damage/perforation, and on the other hand, the function of joining to the next sheet which is to be installed.

What is claimed is:

1. A multilayer composite sheet for use in the building sector for sealing punctures, comprising a planar sheet body having at least one of a membrane layer, at least one protective layer and at least one elastic sealing layer formed at least in part of a foam material having an elasticity and resilience sufficient to, when the sealing layer is penetrated by a fastener, produce a seal closing an opening formed by the penetration of the fastener, wherein the sealing layer produces an amount of sealing [N/5 cm×μm] of between 3 N/5 cm ×μm and 10000 kN/5 cm ×μm computed from the relationship:

$$MDA = F_r \times d$$

where $F_r$ in N/5 cm is the restoring force of the material of the sealing layer and d is the thickness in μm of the sealing layer, said amount of sealing being a tightness for a static water column that is greater than 200 mm while being diffusion-open, wherein the membrane layer is a water vapor-permeable film, wherein the at least one protective layer is formed of a material able to protect the membrane against mechanical damage, wherein the membrane layer is located between the sealing layer and the at least one protective layer, and wherein said elastic foam is an open-pore elastic foam.

2. The sheet in accordance with claim 1, wherein the sheet is an underlay or facade sheet.

3. The sheet in accordance with claim 1, wherein the membrane has a layer thickness between 10 μm and 1000 μm.

4. The sheet in accordance with claim 3, wherein the protective layer is made of a material having a density between 1 and 2200 kg/m³, and a layer thickness of between 30 μm and 3000 μm.

5. The sheet in accordance with claim 1, wherein the protective layer is made of a material having a density between 1 and 2200 kg/m³, and a layer thickness of between 30 μm and 3000 μm.

6. The sheet in accordance with claim 1, wherein the protective layer is a nonwoven layer which contributes to planar stability.

7. A multilayer composite sheet for use in the building sector for sealing punctures, comprising a planar sheet body having at least one of a membrane layer, at least one protective layer and at least one elastic sealing layer formed at least in part of a foam material having an elasticity and resilience sufficient to, when the sealing layer is penetrated by a fastener, produce a seal closing an opening formed by the penetration of the fastener, wherein the sealing layer produces an amount of sealing [N/cm×μm] of between 50 N/5 cm×μm and 1000 N/5 cm×μm computed from the relationship:

$$MDA = F_r \times d$$

where $F_r$ in N/5 cm is the restoring force of the material of the sealing layer and d is the thickness in μm of the sealing layer, said amount of sealing being a tightness for a static water column that is greater than 200 mm while being diffusion-open, wherein the membrane layer is a water vapor-permeable film, and wherein the at least one protective layer which is form of a material able to protect the membrane against mechanical damage, wherein the membrane layer is located between the sealing layer and the at least one protective layer, and wherein said elastic foam is an open-pore elastic foam.

8. The sheet in accordance with claim 7, wherein the membrane has a layer thickness between 10 μm and 1000 μm.

9. The sheet in accordance with claim 8, wherein the protective layer is made of a material having a density between 1 and 2200 kg/m³, and a layer thickness of between 30 μm and 3000 μm.

10. The sheet in accordance with claim 7, wherein the protective layer is made of a material having a density between 1 and 2200 kg/m³, and a layer thickness of between 30 μm and 3000 μm.

11. The sheet in accordance with claim 7, wherein the protective layer is a nonwoven layer which contributes to planar stability.

* * * * *